United States Patent [19]

Cyphelly

[11] 3,998,501
[45] Dec. 21, 1976

[54] SHAFT LOCATING ARRANGEMENT

[76] Inventor: Ivan Jaroslav Cyphelly, Forchstrasse 968, 8128-Hinteregg, Switzerland

[22] Filed: Feb. 17, 1976

[21] Appl. No.: 658,835

[52] U.S. Cl. .................................. 308/9; 308/72; 308/122
[51] Int. Cl.² ...................................... F16C 17/16
[58] Field of Search ................ 308/9, 36.3, 72, 78, 308/122, 123

[56] References Cited
UNITED STATES PATENTS

| | | | |
|---|---|---|---|
| 3,391,965 | 1/1968 | Lindeboom | 308/9 |
| 3,476,447 | 11/1969 | Boyd | 308/9 |
| 3,639,014 | 2/1972 | Sixsmith | 308/9 |
| 3,938,862 | 2/1976 | Schurger et al. | 308/9 |

*Primary Examiner*—Joseph F. Peters
*Assistant Examiner*—Gene A. Church
*Attorney, Agent, or Firm*—Hans Berman

[57] ABSTRACT

A locating arrangement for a shaft rotatable in a bore of a support includes a first annular locating element radially interposed between the support and the shaft. Two annular surfaces of the element are axially offset in opposite directions from the orifice of a supply conduit for pressure fluid in the bore of the support and formed with respective pairs of grooves arcuate about the axis of rotation, the grooves of each pair being adjacent and remote from the orifice respectively and bounded by lands of the associated surfaces. Ducts connect each adjacent groove to an axially offset remote groove. A second annular locating element has two face portions associated in parallel relationship with the afore-mentioned lands of respective surfaces and defining throttling gaps with the associated surfaces which communicate with the orifice of the supply conduit. The locating elements are respectively secured to the shaft and support and keep the shaft floating in the bore of the support in the presence of pressure fluid in a precisely defined position.

10 Claims, 5 Drawing Figures

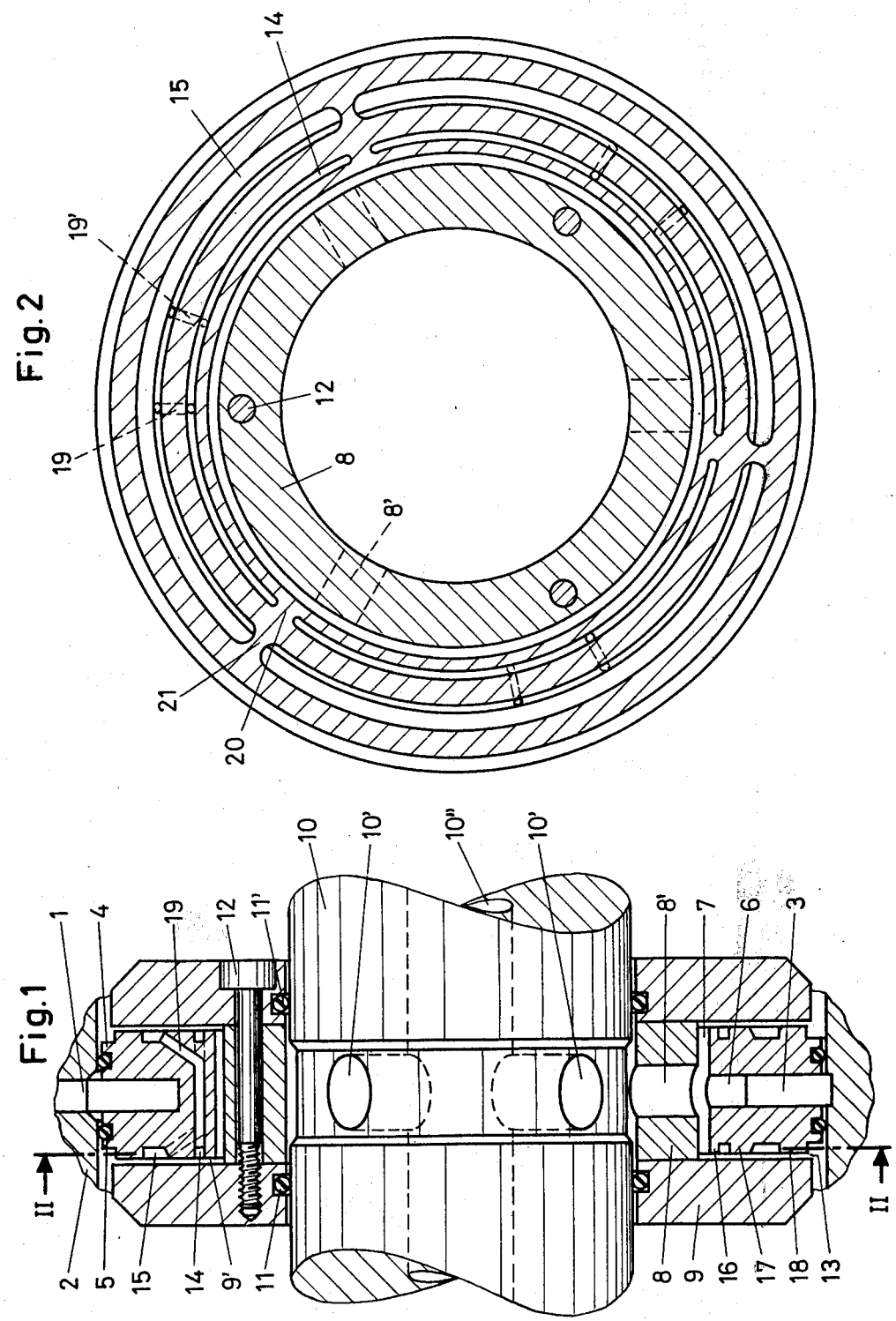

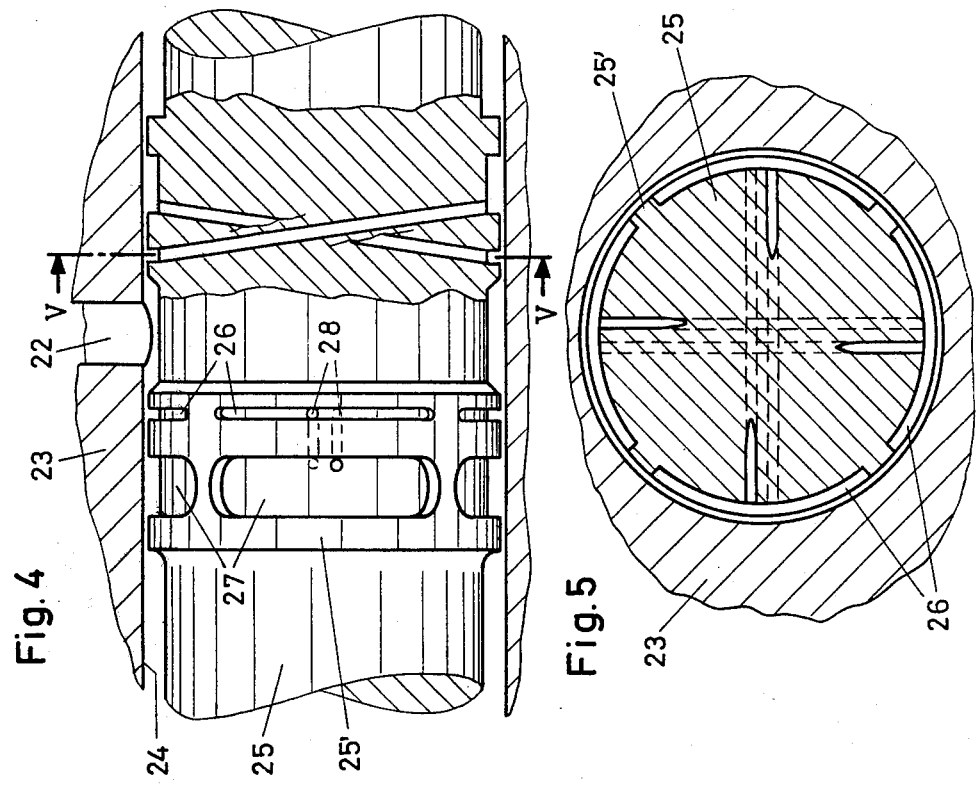
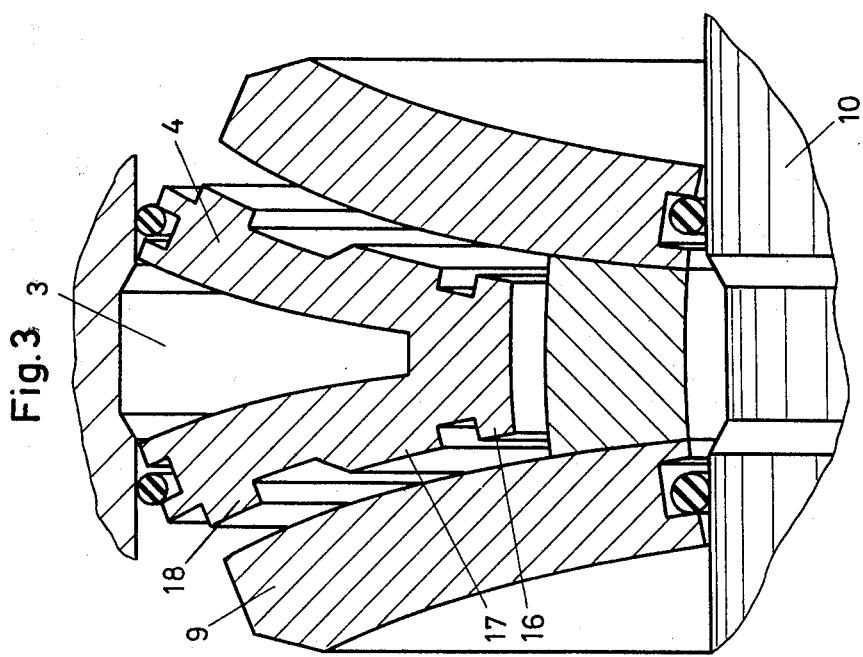

SHAFT LOCATING ARRANGEMENT

This invention relates to locating arrangements, and particularly to an arrangement in which a shaft is kept coaxially centered in precisely defined axial position in a bore of a support by the hydrostatic pressure of a fluid in throttling gaps separating locating elements on the shaft and support and supplied to grooves in surfaces of one element bounding the gaps.

In known arrangements of the type described, the distribution of hydraulic pressure is assymetrical so that the cooperating elements are deformed in an unpredictable manner when the fluid pressure reaches extremely high values, and the arrangement becomes inoperative.

It is a primary object of the invention to provide a locating arrangement of the general type described which is suitable for operation with hydraulic fluid under extremely high pressure, and thus suitable for very high loads. It is another object of the invention to provide such an arrangement which may simultaneously be employed for supplying apparatus mounted on the shaft with fluid under high hydrostatic pressure.

With these objects and others in view, as will hereinafter become apparent, the locating arrangement of the invention includes a support member and a shaft member rotatable in a bore of the support member, the latter being formed with a supply conduit for liquid under high pressure which conduit has an orifice radially open toward the bore. A first locating element radially interposed between the members in the bore is secured to one member and cooperates with a second locating element on the other member. The first locating element has two annular surfaces about the axis of shaft rotation, the surfaces being offset from the orifice of the supply conduit in opposite axial directions and each formed with two grooves arcuate about the axis, the grooves being adjacent and remote from the orifice respectively and bounded by lands of the associated surface. Two ducts respectively connect the two adjacent grooves to respective, axially offset grooves remote from the orifice.

The second locating element has two face portions associated in parallel relationship with the lands of the respective surfaces of the first locating element, each face and the associated lands defining a throttling gap therebetween. The gaps communicate with the orifice to receive fluid under pressure.

Other features, additional objects, and many of the attendant advantages of this invention will readily be apppreciated as the same becomes better understood by reference to the following detailed description of preferred embodiments when considered in connection with the appended drawing in which:

FIG. 1 shows a locating arrangement of the invention in fragmentary axial section;

FIG. 2 illustrates annular elements in the arrangement of FIG. 1 in section on the line II — II;

FIG. 3 shows a portion of the apparatus of FIG. 1 on a larger scale and under different operating conditions;

FIG. 4 illustrates a locating arrangement of the invention in a fragmentary axial section; and FIG. 5 shows the device of FIG. 4 in section on the line V — V.

Referring initially to FIG. 1, there is seen a shaft 10 coaxially received in a cylindrical bore of a stationary support 2 with ample clearance. Hydraulic fluid having lubricant properties is supplied under high pressure through a conduit in the support 2 to an orifice 1 radially open toward the bore of the support. An annular groove 3 in the outer circumference of an annular locating element 4 is radially aligned with the orifice 1. Resilient O-rings 5 radially interposed between the inner wall of the support 2 and the outer circumference of the element 4 on either axial side of the orifice 1 and the groove 3 prevent escape of fluid and angular movement of the element 4 relative to the support 2 while permitting very limited axial displacement, as will be shown in FIG. 3.

Radial ducts 6 circumferentially distributed in the element 4 about the groove 3 lead to an annular manifold chamber 7 radially bounded by the element 4 and a spacer ring 8, and axially bounded by respective radial face portions 9' of two flat rings 9, the rings 8, 9 being fixedly fastened to each other by screws 12 of which only one is seen in FIG. 1. The axial spacing of the faces 9' is sufficient to receive the element 4 between the rings 9 which, jointly with the connecting spacer ring 8, constitute a second locating element fastened to the shaft 10 by O-rings 11.

Radial bores 8' in the spacer ring 8 connect the manifold chamber 7 with a groove in the outer, otherwise cylindrical surface of the shaft 10, the connection being sealed by the rings 11. Radial bores 10' lead from the surface groove of the shaft to an axial bore 10'' which provides fluid under high hydrostatic pressure to apparatus mounted on the shaft 10 in a manner known in itself and not illustrated.

As is also evident from FIG. 2 showing only the locating elements, the two, normally planar and radial surfaces of the element 4, which are axially offset from the orifice 1 in opposite axial directions, are each formed with a relatively narrow, circularly arcuate, radially inner groove 14 and a coaxial, wider, radially outer groove 15 nearer the orifice 1 than the groove 14. The grooves divide each radial surface of the element 4 into three, normally co-planar, concentric lands 16, 17, 18. Three narrow partitions 20, 21 divide each groove 14, 15 into three compartments, each partition 20 being radially aligned with a partition 21.

Six ducts 19 through the element 4 connect the compartments of the groove 14 in each radial surface with respective compartments of the groove 15 in the other surface of the element 4, the entire arrangement being symmetrical relative to a radial plane through the orifice 1.

Throttling gaps 13 separate the faces 9' of the rings 9 from the lands 16, 17, 18 of associated radial surfaces of the element 4. The axial width of the gaps 13 has been exaggerated in FIG. 1 as compared to the depth of the grooves 14, 15 for the convenience of pictorial representation. The pressure of hydraulic fluid uniformly distributed in the gaps 13 by the ducts 19 and the grooves 14, 15 keeps the element 4 axially precisely centered in floating relationship between the face portions 9' of the other locating element. The partitions 20, 21 suppress any tendency of wobbling in the illustrated arrangement so that the shaft 10 stably maintains a fixed axial position.

While the fluid employed for stabilizing and lubricating the shaft 10 in the support 2 performs the added function of energizing non-illustrated apparatus on the shaft 10, the arrangement illustrated in FIGS. 1 and 2 is useful in itself even if the bores 10', 10'' in the shaft 10 are blocked.

Under very high fluid pressure, the locating elements are resiliently deformed in the manner illustrated in FIG. 3, the extent of the deformation being somewhat exaggerated for greater clarity. The pressure of the liquid in the groove 3 causes the split circumferential portion of the element 4 to spread axially. The rings 9 are so dimensioned that their free, radially outer rims are similarly spread apart by the liquid pressure in the gaps 13 so that the width of each gap 13 remains substantially constant at varying liquid pressures which are precisely balanced by the liquid pressures in the other gap 13.

In the bearing arrangement of the invention shown in FIGS. 4 and 5, a support 23 has a cylindrical inner wall 24 bounding a bore in the support. The orifice 22 of a supply conduit for liquid under high hydrostatic pressure is radially open toward the bore and toward a shaft 25 coaxially rotatable in the bore.

The otherwise smoothly cylindrical shaft 25 has two radially enlarged, annular portions 25' on axially opposite sides of the orifice 22, the bearing arrangement being symmetrical relative to a radial plane through the orifice 22. The generally cylindrical outer surfaces of the shaft portions 25' are each formed with a narrow circular groove axially adjacent the orifice 22 and divided circumferentially into four compartments 26 by narrow partitions. A wider circular groove more remote from the orifice 22 is similarly divided into four circumferential compartments 27. The lands of each shaft portion 25' separated by the groove compartments 26, 27 bound a throttling gap with the inner support wall 24. A duct 28 approximately diametrically passing through the shaft 25 connects each compartment 26 with an axially offset compartment 27 in the same shaft portion 25'.

The small leakage of hydraulic fluid from the orifice 22 through the conduit partly defined by the lands of the shaft portions 25' and partly by the ducts 28 causes the pressure of the liquid in the wider compartments 27 to be lower than in the narrow compartments 26. The forces urging the shaft 10 toward a centered position in the support 23 are thus uniformly distributed over the circumference of the shaft and over most of the axial length of the bearing arrangement. The radial position of the shaft 25 is precisely maintained regardless of the pressure of the hydraulic fluid received from the orifice 22 which cannot cause asymmetrical distortion of any element of the bearing arrangement.

As is not explicitly shown, but obvious from FIGS. 1 and 2, the bearing arrangement illustrated in FIGS. 4 and 5 is readily modified to function as a coupling between the orifice 22 and apparatus on the shaft 25 which requires hydraulic fluid for its operation.

A shaft 10, 25 will usually be received in more than one locating arrangement of the invention, and may be associated with two identical devices of either type described above or with one arrangement of each type for precise axial and radial locating.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A shaft locating arrangement comprising:
   a. a support member formed with a bore, said bore having an axis, and with a supply conduit having an orifice radially open toward said bore;
   b. a shaft member rotatable in said bore about said axis;
   c. first locating means radially interposed between said members in said bore and secured to one of said members,
      1. said first locating means having two annular surfaces about said axis,
      2. said surfaces being offset from said orifice in opposite axial directions,
      3. each surface being formed with two grooves arcuate about said axis, said grooves being adjacent and remote from said orifice respectively and bounded by lands of said surface,
      4. said first locating means including two ducts respectively connecting the two adjacent grooves to respective axially offset grooves remote from said orifice; and
   d. second locating means on the other one of said members and having two face portions associated in parallel relationship with the lands of said surfaces respectively,
      1. each face portion and the associated lands defining a throttling gap therebetween,
      2. said gap communicating with said orifice.

2. An arrangement as set forth in claim 1, wherein said first and second locating means are symmetrical relative to a radial plane through said orifice, one of the grooves in each of said surfaces being narrower than the other groove, at least one of said locating means defining a conduit connecting said gaps to said orifice for flow of fluid from said orifice to said narrower grooves, and for flow of said fluid from said narrower grooves to said other grooves through said ducts.

3. An arrangement as set forth in claim 1, wherein said first locating means include an annular element carrying said surfaces, said surfaces extend radially relative to said axis in axially spaced relationship, said face portions are planar and radial in the absence of fluid under pressure in said gaps, the grooves in each of said surfaces are circularly arcuate and concentric, and each duct connects respective grooves in said two surfaces.

4. An arrangement as set forth in claim 3, wherein said second locating means includes two bearing rings and a spacer ring axially interposed between said bearing rings, said bearing rings receiving said annular element therebetween and carrying said face portions respectively.

5. An arrangement as set forth in claim 3, wherein said annular element is formed with an annular groove open in a radially outward direction for direct communication with said orifice, whereby the outer circumferential portion of said annular element is spread under sufficient pressure of fluid supplied by said conduit, said bearing rings being dimensioned to be deformed simultaneously by the pressure of fluid received in said gaps and thereby to maintain the widths of said gaps substantially constant.

6. An arrangement as set forth in claim 3, wherein said annular element is secured to said support member against angular displacement.

7. An arrangement as set forth in claim 1, wherein said surfaces are cylindrically arcuate about said axis, the two grooves in each surface being axially spaced, each of said ducts connecting a portion of an adjacent groove in one of said surfaces with a portion of a remote groove in the same surface, said portions of said grooves being oppositely spaced from said axis.

8. An arrangement as set forth in claim 7, wherein said first locating means are secured on said shaft member against displacement, an inner wall of said support member in said bore carrying said face portions.

9. An arrangement as set forth in claim 1, wherein said grooves are circularly arcuate about said axis, a plurality of partitions circumferentially dividing each groove into a plurality of compartments.

10. An arrangement as set forth in claim 1, wherein said shaft member is formed with an axial bore and a radial bore leading outward from said axial bore, at least one of said locating means defining a conduit connecting said orifice to said radial bore.

* * * * *